United States Patent [19]
Benson

[11] Patent Number: 5,286,376
[45] Date of Patent: Feb. 15, 1994

[54] FILTERING APPARATUS

[76] Inventor: Robert A. Benson, 13 Commonwealth Ave., Boston, Mass. 02116

[21] Appl. No.: 837,487
[22] Filed: Feb. 18, 1992
[51] Int. Cl.⁵ .................... B01D 29/23; B01D 35/00
[52] U.S. Cl. .................... 210/194; 210/355; 210/407; 210/413
[58] Field of Search .................... 210/209, 194, 195.1, 210/199, 206, 354, 355, 405, 407, 413, 414

[56] References Cited
U.S. PATENT DOCUMENTS 4,267,043  5/1981  Benson ..................... 210/241
4,328,098  5/1982  Benson ..................... 210/241

Primary Examiner—Stanley S. Silverman
Assistant Examiner—Robert James Popovics

[57] ABSTRACT

A filter medium is provide in a tubular structure configured in the form of a closed loop. Filter maintenance structures mounted on a continuous string lying within the lumen of the tubular structure are continually driven over the surface of a filter medium to maintain an optimum condition of the filter surface. This string with attached filter maintenance structures is driven around the loop of the tubular structure by hydraulic forces generated by the fluid introduced into the apparatus for filtering.

9 Claims, 2 Drawing Sheets

FILTERING APPARATUS

BRIEF SUMMARY OF THE INVENTION

This invention relates to the separation of a clear filtrate (or a filtrate containing only a fine component of suspended particles) from a body of fluid in which particles are suspended (or a mix of both coarse and fine particles) are suspended.

In conventional filtering operations the particles which do not pass the filter tend to remain at the filter surface and clog the pores of the filter. This accumulation of particles changes the characteristics of the filter, degrading it from optimum.

The subject invention provides filter maintenance structures which are continually driven over the surface of a filter medium to maintain an optimum condition of the filter surface. The filter medium is provided in a tubular structure configured in the form of a closed loop. The filter maintenance structures are mounted on a continuous string which lies within the lumen of the tubular structure. This string with attached filter maintenance structures is driven around the loop of the tubular structure by hydraulic forces generated by the fluid introduced into the apparatus for filtering.

DETAILED DESCRIPTION

Figure 1:
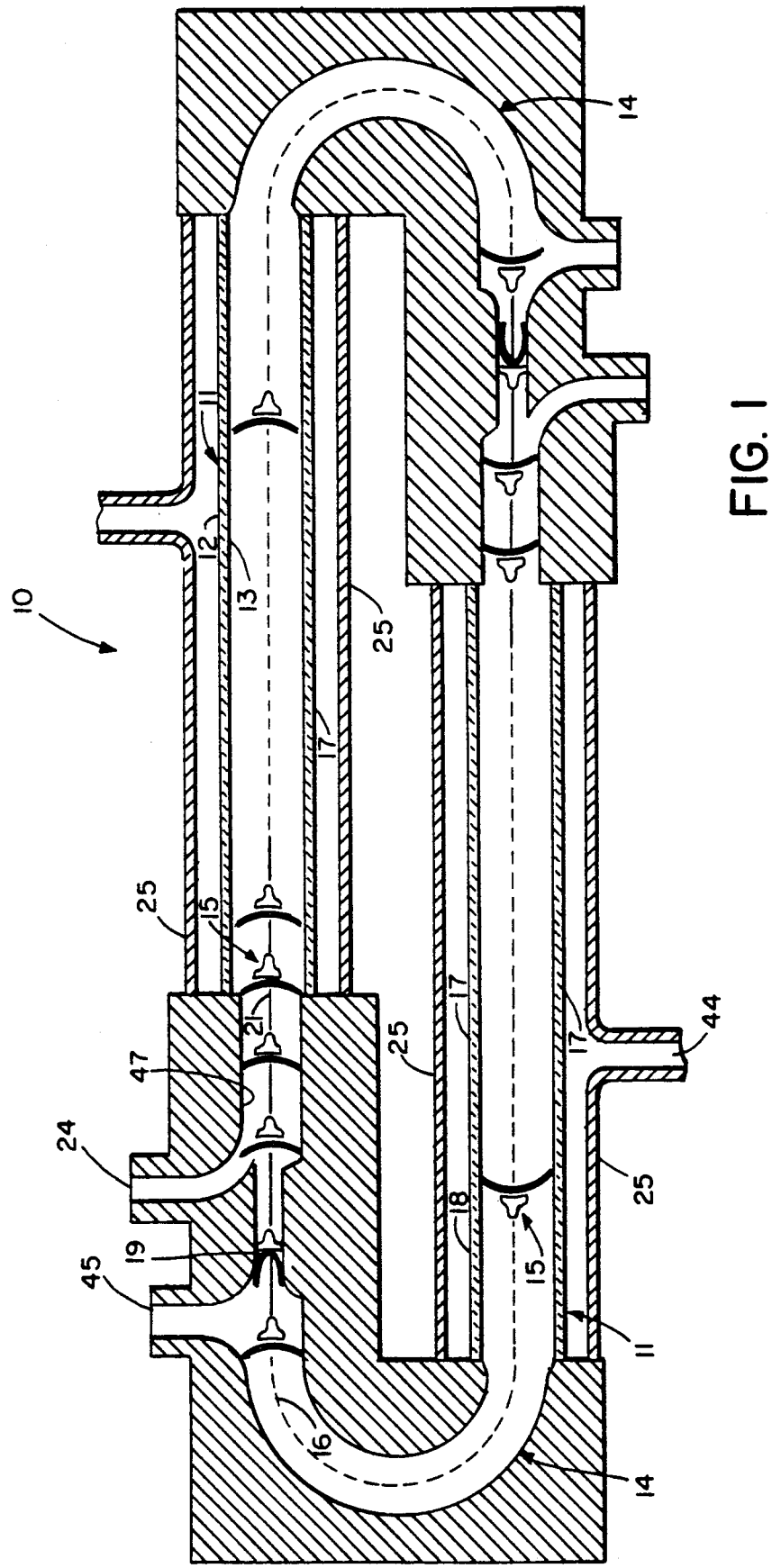
FIG. 1 shows a cross-sectional view of filtering apparatus according to the invention.
Figure 2:
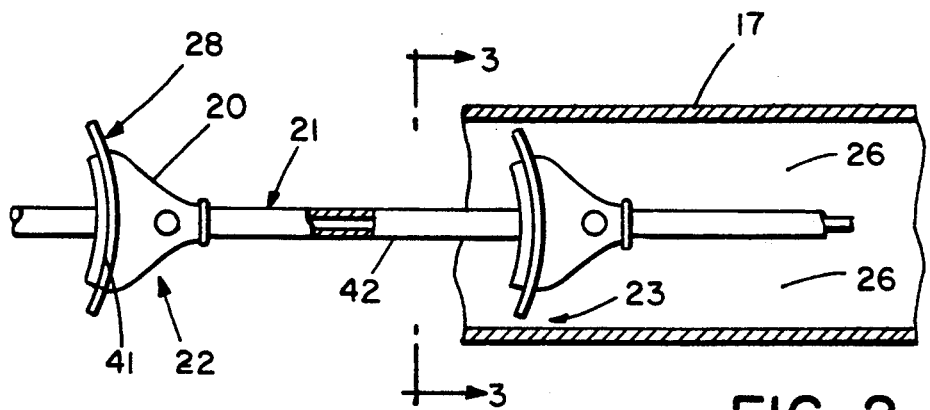
FIG. 2 shows in greater detail a portion of the apparatus of FIG. 1, including a portion of a porous tube wall and a runner which lies therein.
Figure 3:
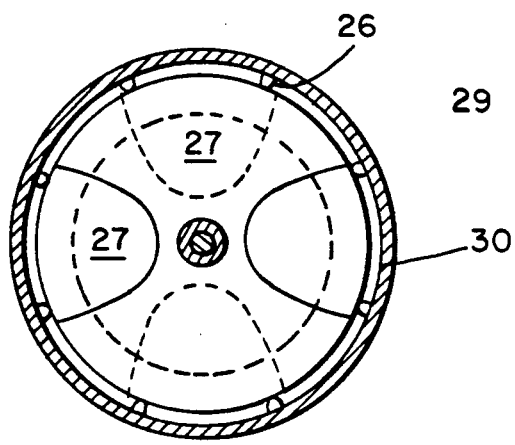
FIG. 3 shows a cross-sectional view as indicated in FIG. 2 of the porous tube wall and the runner.

Apparatus 10 according to the invention includes, as is shown in the Figures, tubular structure 11 with wall 12, which defines lumen 13, in the form of a closed loop 14. Inlet passage 24 permits introduction of fluid into lumen 13, and outlet passage 45 permits withdrawal of fluid. Wall 12 of lumen 13 includes portions 17 which are porous with pores 18 therethrough, portions 17 having a uniform cross-section. As shown particularly in FIG. 1, porous portions 17 of lumen 13 comprise the major portion and in particular more than half of closed loop 14 of the lumen. Shell 25 surrounding porous portions 17 provides a means for collecting fluid which has passed through pores 18 for discharge through drain port 44. Lands 26 lie along the inner surface of porous portions 17. Wall 12 of lumen 13 also includes reduced cross-section portions 19 in which the lumen has a smaller cross section than in the porous portions. Wall 12 of lumen 13 also includes intermediate cross-section portion 47 in which the lumen has a cross section intermediate in size between that of porous portions 17 and reduced cross-section portions 19. As is shown particularly in FIG. 1, the apparatus is made in two replicated parts connected to achieve a looped configuration.

Runner 15 which has a generally linear form and is connected in a closed loop 16 lying within lumen 13 and is free to move through lumen 13. Runner 15 includes string 21 and beads 22 attached to and disposed at intervals along string 21. Beads 22 include blocking structures 20 and filter maintenance structures 28. Blocking structures 20 are sized so that when in reduced cross section portion 19, they block flow therethrough. Filter maintenance structures 28 are deformable, assuming, when within the lumen of porous portions 17, an expanded state with cross-section greater than that of reduced cross-section portion 19 and defining a constricted flow passage 23 between the filter maintenance structure and the opposed porous wall portion 17. When within intermediate cross-section portion 47, filter maintenance structures 28 fit snugly to the walls of the lumen. When within reduced cross section portion 19, filter maintenance structures 28 assume a compressed state which permits them to pass through reduced cross-section portion 19.

Figure 4:
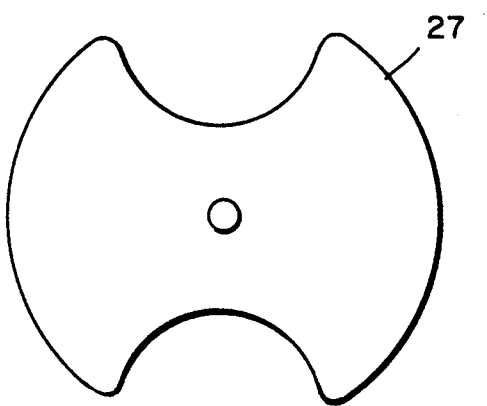
FIG. 4 shows an component of the beads which are part of the runner of FIG. 2.

The filter maintenance structures may advantageously be constructed of two or more blade elements 27 cut from flexible sheet material in a shape as shown particularly in FIG. 4. Blade elements 27 are overlapped and mounted coaxially on string 21 and bent to form a generally cone-shaped structure 28 with a circular periphery 29 by pressing it against hollowed face 41 of blocking structure 20 by collar 42 positioned around flexible inner member 43 of string 21. The size and overlapping of blade elements are chosen so that, when so pressed against blocking structure 20, circular periphery 29 has a diameter slightly smaller than the lumen of the porous portions of the tubular structure so as to define an annular gap 30 between the maintenance structure periphery and the opposed lumen.

The operation of the apparatus according to the invention is as follows. A source of fluid is connected to inlet passage 24 and drain lines are connected to outlet passage 45 and drain port 44. Fluid at some pressure is introduced through inlet passage 24 and withdrawn from ports 45 and 44 at a lower pressure. This pressure differential acting on the beads in portions of the lumen having different cross-sectional areas causes a flow around the loop in a clockwise direction and drives the runner around the loop also in a clockwise direction. Some quantity of fluid passes through the pores of the porous wall and is collected for delivery to port 44. The fluid passing through the pores will have suspended therein no particles greater than some cut-off size which are unable to pass through the pores. The fluid passing through the pores and collected at port 44 may be without suspended particles or may contain particles smaller than this cut-off size. In the ordinary operation of the apparatus there will be particles greater than the cut-off size suspended in the fluid within lumen 13, which are either retained there or withdrawn through port 45.

The runner moving along the lumen of the tubular structure carries the attached beads with it so that a filter maintenance structure frequently passes every part of the porous wall. As the maintenance structure passes a wall portion it creates strong flow perturbations in the constricted flow passage between the maintenance and the lumen wall which dislodge particles which have lodged in the entrance to pores of the wall. In some instances the maintenance structure may also contact particles so lodged, knocking them loose or breaking them. The passage of the maintenance structures thus cleanses the pores of the filter free of clogging particles and maintains the filter surface in optimum condition for effective filtering action.

The blocking structures 20 primarily function to prevent direct flow from inlet port 21 to outlet port 45 without passing around the loop.

The lands 26 positioned along the inner surface of the porous wall prevent the filter maintenance structures from directly contacting the porous wall surface. This is particularly useful in preventing abrasion when the porous wall surface is fragile or soft. When the the porous wall surface is hard, the lands may sometimes be advantageously dispensed with, in which case the filter maintenance structures will intermittantly touch the wall.

Figure 5:
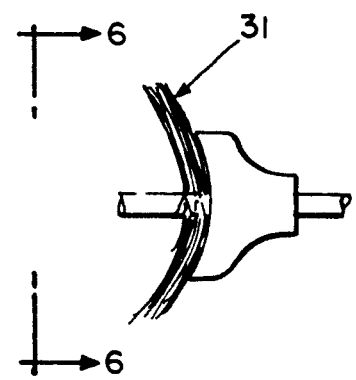
FIG. 5 shows an alternative bead for attachment to the runner of FIG. 2.
Figure 6:
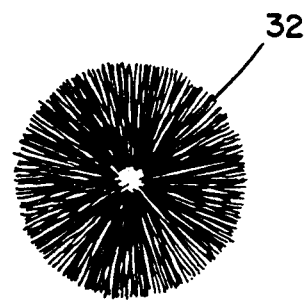
FIG. 6 shows another view of the bead of FIG. 5.

The filtering apparatus may be applied in a wide variety of filtering conditions. In particular, different porous wall constructions and pore size may be used to accommodate various desired particle cut-off sizes. Also variant designs of filter maintenance structures may be used. The alternative filter maintenance structure of FIGS. 5 and 6 may advantageously be used for delicate filter material or fine particles. As shown in FIGS. 5 and 6, a brush structure 31 has flexible fibers 32 fixed centrally to string 21 and extending to a radius greater than that of reduced cross-section 19.

The apparatus may be used with a somewhat different procedure in an application such as when a suspended particle catalyst is used to promote a reaction. The particulate catalyst may be loaded into the lumen in a preliminary operation. Then the reactants are continuously added through port 24 so that they will be in contact with the suspended catalyst in the lumen. The reaction products are drawn off through the porous wall leaving the particulate catalyst behind. In such an application outlet port 45 need not be used, the once-loaded catalyst remaining in the lumen for the duration of the operation.

What is claimed is:

1. Apparatus for separating from a stream of fluid with particles greater than a cut-off size suspended therein a stream of fluid lacing particles of size larger than said cut-off size,
    said apparatus comprising a tubular structure with a wall and a lumen, said lumen being in a form of a closed loop, said tubular structure wall having porous portions with pores therethrough, said lumen within said porous portions being of uniform cross-section,
    said apparatus comprising a passage for introducing fluid into said lumen and means for collecting fluid which has passed from said lumen through said pores
    said tubular structure having a reduced cross-section portion, the lumen therein having a diameter less than a diameter of the lumen in said porous portions,
    said apparatus comprising a runner of generally linear form connected in a loop, lying within the lumen of said tubular structure, and being free to move along said lumen,
    said runner including a string and a plurality of beads disposed at intervals along said string,
    said beads comprising
        blocking structures which when within the lumen of said reduced cross-section portion block flow therethrough and
        filter maintenance structures which are deformable, assuming an expanded state when within the lumen of the porous portions and a compressed state when within the lumen of the reduced cross-section portion, each filter maintenance structure when in a compressed state fitting within the lumen of the reduced cross-section portion, each filter maintenance structure when in an expanded state extending over a cross-section greater than the cross-section of the reduced cross-section portion so as to define a constricted flow passage between each filter maintenance structure and tubular structure wall opposed thereto.

2. Apparatus as claimed in claim 1, each of said filter maintenance structures further comprising two lobed blade elements made of flexible sheet material, said blade elements being bent to cooperatively form a generally cone-shaped structure with said lobed blade elements overlapping in contact with one another and with each of said lobed blade elements providing a peripheral edge portion of said cone-shaped structure, said cone-shaped structure being coaxial with said string, said blade elements being overlapped to a first degree while the bead of which it is a part is within said porous portion so as to have a circular periphery with diameter less than the diameter of the lumen of the porous portion and thereby to define an annular gap between the circular periphery and the opposed lumen, said blade element being, when within said reduced cross-section portion, overlapped to a second degree, greater than said first degree, so as to pass through the lumen of the reduced cross-section portion.

3. Apparatus as claimed in claim 1, each of said filter maintenance structures including a peripheral brush structure with fibers extending to a diameter greater than a diameter of said reduced cross-section portion, said fibers flexing to admist said filter maintenance structure into said reduced cross-section portion.

4. Apparatus as claimed in claim 1, said passage for introducing fluid being connected to a source of reactants and including a catalyst in particulate form suspended in fluid within said lumen, said catalyst being effective in catalyzing a reaction of said reactants., said catalyst being in particles too large to pass through said pores of said porous portions.

5. Apparatus as claimed in claim 1, said tubular structure including an intermediate portion wherein said lumen has a cross-section greater than that in said reduced cross-section portion and less than that in said porous portions, said intermediate portion being situated between said passage for introducing fluid and said porous portions.

6. Apparatus as claimed in claim 5, the lumen in said intermediate portion having a diameter equal to that of said filter maintenance structures in their expanded states.

7. Apparatus as claimed in claim 1, wherein said porous portions of uniform cross section comprise more than half of the closed loop of said lumen.

8. Apparatus for separating from a stream of fluid with particles greater than a cut-off size suspended therein a stream of fluid lacking particles of size larger than said cut-off size,
    said apparatus comprising a tubular structure with a wall and a lumen, said lumen being in a form of a closed loop, said tubular structure wall having porous portions with pores therethrough, said lumen within said porous portions being of uniform cross-section,
    said apparatus comprising a passage for introducing fluid into said lumen and means for collecting fluid which has passed from said lumen through said pores said tubular structure having a reduced cross-section portion, the lumen therein having a diameter less than a diameter of the lumen in said porous portions, said apparatus comprising a runner of generally linear form connected in a loop, lying within the lumen of said tubular structure, and being free to move along said lumen, said runner including a string and a plurality of beads disposed at intervals along said string, said beads comprising blocking structures which when within the lumen of said reduced cross-section portion block flow therethrough and filter maintenance structures which are deformable, assuming an expanded state when within the lumen of the porous portions and a compressed state when within the lumen of the reduced cross-section portion, each filter maintenance structure when in a compressed state fitting within the lumen of the reduced cross-section portion, each filter maintenance structure when in an expanded state extending over a cross-section greater than the cross-section of the reduced cross-section portion so as to define a constricted flow passage between each filter maintenance structure and tubular structure wall opposed thereto, said porous portions having lands thereon protruding into said lumen, said lands preventing said beads from contacting said porous portions.

9. Apparatus for separating from a stream of fluid with particle greater than a cut-off size suspended therein a stream of fluid lacking particles of size larger than said cut-off size, said apparatus comprising a tubular structure with a wall and a lumen, said lumen being in a form of a closed loop, said tubular structure wall having porous portions with pores therethrough, said lumen within said porous portions being of uniform cross-section, said apparatus comprising a passage for introducing fluid into said lumen and means for collecting fluid which has passed from said lumen through said pores said tubular structure having a reduced cross-section portion, the lumen therein having a diameter less than a diameter of the lumen in said porous portions, said apparatus comprising a runner of generally linear form connected in a loop, lying within the lumen of said tubular structure, and being free to move along said lumen, said runner including a string and a plurality of beads disposed at intervals along said string, said beads comprising blocking structures which when within the lumen of said reduced cross-section portion block flow therethrough and filter maintenance structures which are deformable, assuming an expanded state when within the lumen of the porous portions and a compressed state when within the lumen of the reduced cross-section portion, each filter maintenance structure when in a compressed state fitting within the lumen of the reduced cross-section portion, each filter maintenance structure when in an expanded state etending over a cross-section greater than the cross-section of the reduced cross-section portion so as to define a constricted flow passage between each filter maintenance structure and tubular structure wall opposed thereto, each of said filter maintenance structures further having a plurality of blade elements made of flexible sheet material, said blade elements being bent to cooperatively form a generally cone-shaped structure coaxial with said string, said blade elements being overlapped to a first degree while the bead of which it is a part is within said porous portion so as to have a circular periphery with diameter less than the diameter of the lumen of the porous portion and thereby to define an annular gap between the circular periphery and the opposed lumen, said blade elements being, when within said reduced cross-section portion, overlapped to a second degree, greater that said first degree, so as to pass through the lumen of the reduced cross-section portion, wherein said string comprises a flexible inner member, wherein said blocking structure is affixed to said flexible inner member, wherein said blocking structure has a hollowed face, wherein said filter maintenance structure is pressed against said hollow face by a collar around said flexible inner member so as to form the blade elements of said filter maintenance structure into said first degree of overlapping.

* * * * *

UNITED STATES PATENT AND TRADEMARK OFFICE
CERTIFICATE OF CORRECTION

PATENT NO. : 5,286,376
DATED      : Feb 15, 1994
INVENTOR(S) : Benson

It is certified that error appears in the above-indentified patent and that said Letters Patent is hereby corrected as shown below:

In col 3, line 39: "lacing" should be --lacking--.

In col 4, line 34: "admist" should be --admit--.

In col 5, line 36: "particle" should be --particles--;

In col 6, line 21: "etending" should be --extending--;

In col 6, line 40: "that" should be --than--.

Signed and Sealed this

Twentieth Day of September, 1994

Attest:

BRUCE LEHMAN

*Attesting Officer*   *Commissioner of Patents and Trademarks*